Dec. 19, 1967  R. A. BEESLEY  3,358,913
MULTI-SECTION BLOWER WHEEL
Filed May 31, 1966
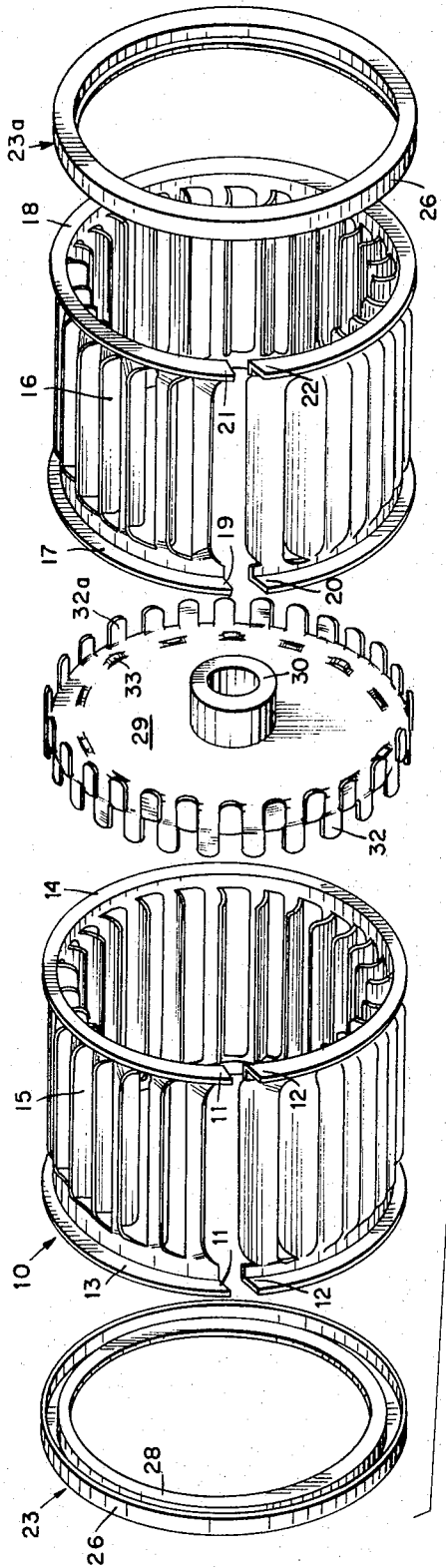
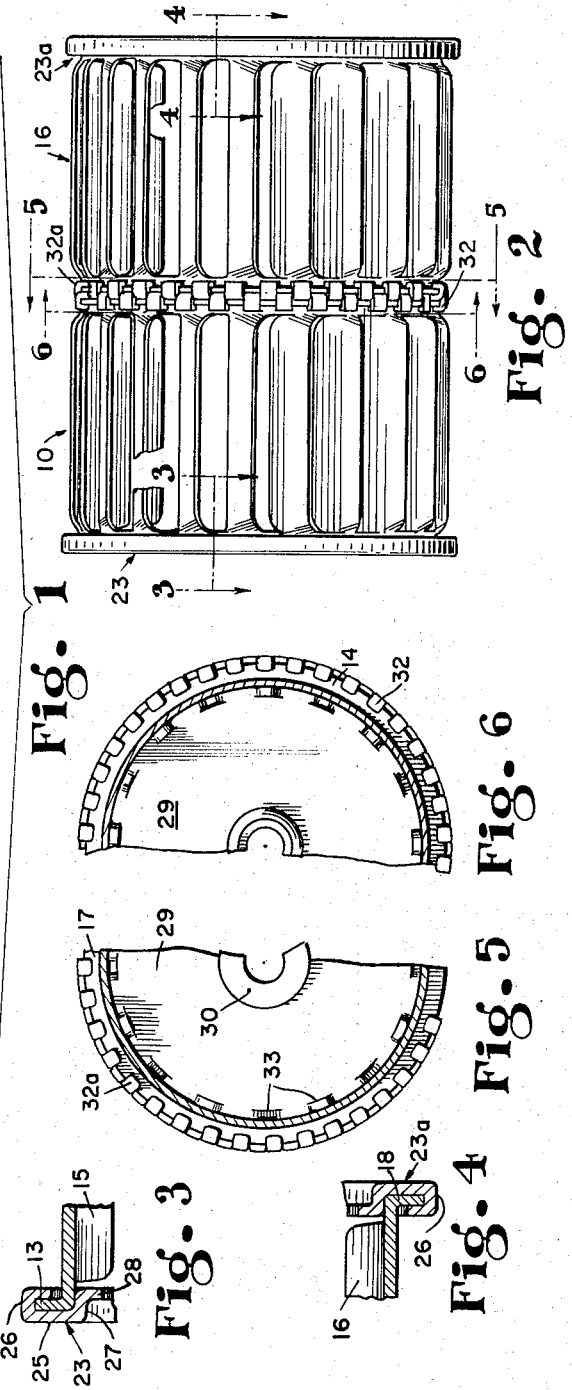
INVENTOR.
ROBERT A. BEESLEY
BY
Herbert A. Weinturn
ATTORNEY

United States Patent Office 3,358,913
Patented Dec. 19, 1967

3,358,913
MULTI-SECTION BLOWER WHEEL
Robert A. Beesley, Westport, Ind., assignor to
Vernco Corporation, Columbus, Ind.
Filed May 31, 1966, Ser. No. 554,010
5 Claims. (Cl. 230—134)

ABSTRACT OF THE DISCLOSURE

An interconnection between ends of two blower wheels each having an outturned blade carried flange; an intermediate plate; tabs extending from the plate and bent over and around the periphery of the plate clamping the flanges against the plate; and projections around the plate spacing the flanges against the overlying tabs.

This invention relates to blower wheels of the type for moving gases such as air, and in particular relates to a construction wherein two strips of blading are separately coiled into cylindrical shapes and are then united end to end with a partition therebetween, serving in part as an interconnecting member. In this structure, a wheel may be made longer than can be had where but one set of blading is employed. Also it is possible to use a wheel of the inventive construction of a smaller diameter with the longer length for delivery of a given amount of gas.

There is a saving of material and labor in the inventive structure particularly since one back plate may be eliminated in comparison with structures heretofore employed for the same purpose.

These and many other objects and advantages are to be had as will become apparent in the following description of one particular form of the inventive structure as illustrated in the accompanying drawing, in which:

FIG. 1 is an exploded view with parts in perspective of a structure embodying the invention;

FIG. 2 is a view in side elevation of the assembled structure;

FIG. 3 is a detail in section through one side of an end ring on the line 3—3 in FIG. 2;

FIG. 4 is a view in section through the opposite end ring on the line 4—4 in FIG. 2;

FIG. 5 is a detail in transverse section of approximately one-half of the wheel on the line 5—5; and FIG. 6 is a detail in transverse section on the line 6—6 on the opposite side of a central interconnecting member.

A predetermined length of strip blading 10 is rolled into an over-all cylindrical shape to bring ends 11 and 12 of the strip into close proximity one with the other. The lateral edges of the strip are turned at substantially right angles to the axis of the rolled blading 10 to form radially, outwardly extending flanges 13 and 14. Blades 15 extend in fixed manner between and preferably integrally with the flanges.

Like blading 16 as that of the blading 10 is rolled into a cylindrical shape having the same diameter as that of the blading 10 and has radially extending marginal flanges 17 and 18 with respective ends 19, 20 and 21, 22 in close proximity at the respective cylindrical shape ends.

End rings 23 and 23a are formed, one for the outer end of each blading 10 and 16. These rings are identical in diameter and in cross-sectional configuration. Each ring has a primary radial length 25 against which an end flange of the particular blading 10 and 16 bears, FIGS. 3 and 4, when the rings are brought up over the blading flanges 13 and 24. A cylindrical arm 26 extends from the outer edge of the length 25, and also has a shoulder 27 extending from the radially inward edge of the length 25. The flanges 13 and 18 are snugly received in the space between the arm 26 and shoulder 27 of the rings 23 and 23a to seat against the length 25, and the flanges are retained thereagainst by turning the arms 26 over and onto the sides of the flanges opposite the ring lengths 25. Preferably, the arm 26 on each of the rings has a radially inwardly turned flange 28 serving to reinforce the rings 23 and 23a.

The blading 10 and 16 are circumferentially compressed to bring their respective opposing ends together in order that the outer flanges 13 and 18 may be seated in the rings 23 and 23a.

A center member 29, herein shown to be in the nature of a circular plate, carries a central driving hub 30. The periphery of the plate 29 carries a plurality of integral tabs 32 and 32a alternately turned in opposite directions initially parallel to the axis of the plate 29. In the structure herein illustrated, the tabs 32 circumferentially leave the plate 29 immediately adjacent each other.

The flanges 14 and 17, upon the blading 10 and 16 being squeezed to have their flange ends 11, 12 and 19, 20 into approximate abutment respectively will fit snugly under the respective tabs 32 and 32a and against the respective peripheral face portions of the plate 29. The tabs 32 and 32a are then bent over the flanges 14 and 17 respectively as indicated in FIGS. 2, 5 and 6.

The plate 29 is provided on each side with a series of detents 33 spaced on a common circumferential line around the plate and spaced radially inwardly from the tabs 32 and 32a respectively that distance which will permit the flanged ends of the bladings to be received snugly therebetween and thus retain the flanges against radial movement from the tabs. These detents 33 may be formed by punching indents on one face side to produce the detents on the other.

Thus, a rigid two section blower wheel is produced to have a single driving back plate 29 or partition in the wheel all without welding, riveting, or bolting together of parts. Furthermore the wheel may be made in a large range of diameters as well as of over-all lengths.

While the invention has been shown and described in the one best form as now known, obviously there may be employed variations in the structure without departing from the spirit of the invention, and therefore, it is desired that the invention not be limited to that precise form nor any more than may be required by the following claims.

I claim:
1. A blower wheel comprising
    a pair of cylindrically grouped blades extending parallel with a common axis;
    a circumferential flange at each end of each of said pairs carrying the respective ends of the blades;
    a circular member located between the blade groups and having a marginal zone therearound in a radial plane on opposite sides;
    opposing end flanges bearing against said member zones; and
    a plurality of tabs extending from the peripheral edge of said member, part in one axial direction and part in the opposite axial direction over said flanges and radially inwardly thereover from said periphery retaining the flanges respectively, against opposite faces of said member.
2. The structure of claim 1, in which
    said flanges are circular strips to which the blades are integrally attached;
    each of the strips being in a circular shape with opposite ends approaching one another; and
    the flanges bearing against said member being maintained under said tabs with their said ends in approximate abutment.

3. The structure of claim 1, in which there is abutting means extending longitudinally from said marginal zones maintaining said opposing end flanges against said tabs and against radial inward movement.

4. The structure of claim 3, in which said abutting means comprises a plurality of circumferentially aligned detents around said member in contact with the end flanges.

5. The structure of claim 1, in which said flanges at the outer ends of said blades removed from said member each has ends approaching one another; and there is a ring encompassing each of the outer end flanges maintaining those ends in approximate contact one with the other.

References Cited

UNITED STATES PATENTS

| | | | |
|---|---|---|---|
| 2,272,695 | 2/1942 | Evans | 230—134.5 |
| 2,315,407 | 3/1943 | Evans | 230—134.5 |

FOREIGN PATENTS 592,146    5/1956    Canada.

HENRY F. RADUAZO, *Primary Examiner.*